US010621054B2

(12) United States Patent
Waldron et al.

(10) Patent No.: US 10,621,054 B2
(45) Date of Patent: Apr. 14, 2020

(54) METHOD AND SYSTEM FOR RECOVERY OF A FAILED REGISTRY

(71) Applicant: VERISIGN, INC., Reston, VA (US)

(72) Inventors: Joseph Waldron, Herndon, VA (US); Patrick Kane, Ashburn, VA (US)

(73) Assignee: VERISIGN, INC., Reston, VA (US)

( * ) Notice: Subject to any disclaimer, the term of this patent is extended or adjusted under 35 U.S.C. 154(b) by 116 days.

(21) Appl. No.: 15/170,316

(22) Filed: Jun. 1, 2016

(65) Prior Publication Data
US 2016/0350190 A1    Dec. 1, 2016

Related U.S. Application Data

(63) Continuation of application No. 12/556,456, filed on Sep. 9, 2009, now Pat. No. 9,384,097.

(51) Int. Cl.
*G06F 11/14*     (2006.01)
*H04L 29/12*     (2006.01)

(52) U.S. Cl.
CPC ...... *G06F 11/1471* (2013.01); *G06F 11/1451* (2013.01); *G06F 11/1469* (2013.01); *H04L 29/12066* (2013.01); *H04L 61/1511* (2013.01); *G06F 2201/80* (2013.01); *G06F 2201/805* (2013.01); *G06F 2201/82* (2013.01)

(58) Field of Classification Search
CPC .................................................. G06F 11/1471
USPC ....................................................... 707/661
See application file for complete search history.

(56) References Cited

U.S. PATENT DOCUMENTS

| 6,360,256 | B1 * | 3/2002 | Lim ..................... G06F 9/505 |
| | | | 709/203 |
| 6,895,430 | B1 | 5/2005 | Schneider |
| 6,901,436 | B1 | 5/2005 | Schneider |
| 6,973,505 | B1 | 12/2005 | Schneider |
| 7,076,541 | B1 | 7/2006 | Burstein et al. |

(Continued)

OTHER PUBLICATIONS

ICANN. "Building Towards a Comprehensive gTLD Registry Failover Plan." Jun. 1, 2007. 22 pages. https://www.icann.org/resources/pages/registry-failover-2007-06-01-en.*

(Continued)

*Primary Examiner* — Kimberly L Wilson
(74) *Attorney, Agent, or Firm* — MH2 Technology Law Group, LLP

(57) ABSTRACT

A method of recovering a registry includes accessing a plurality of registry zone files for the registry and archiving, on a first periodic basis, the plurality of registry zone files. Each of the registry zone files includes at least domain names, registrar IDs, and status information represented in a first predetermined format. The method also includes accessing bulk WHOIS data for the registry and archiving, on a second periodic basis, the bulk WHOIS data. The bulk WHOIS data includes at least nameserver server names, IP addresses, and status information represented in a second predetermined format. The method further includes validating one of the plurality of archived registry zone files based on a comparison between the plurality of registry zone files and the bulk WHOIS data, publishing the validated registry zone file to a second registry's nameservers, initiating a root zone change request, and updating authoritative nameservers.

15 Claims, 6 Drawing Sheets

(56) References Cited

U.S. PATENT DOCUMENTS

| | | | |
|---|---|---|---|
| 7,188,138 | B1 | 3/2007 | Schneider |
| 7,194,552 | B1 | 3/2007 | Schneider |
| 7,299,299 | B2 * | 11/2007 | Hollenbeck ............ G06Q 10/02 709/245 |
| 7,493,403 | B2 | 2/2009 | Shull et al. |
| 7,565,402 | B2 | 7/2009 | Schneider |
| 7,792,682 | B2 | 9/2010 | Johnson |
| 8,037,168 | B2 | 10/2011 | Schneider |
| 8,224,994 | B1 | 7/2012 | Schneider |
| RE43,690 | E | 9/2012 | Schneider et al. |
| RE44,207 | E | 5/2013 | Schneider |
| 8,458,161 | B2 | 6/2013 | Schneider |
| 8,612,565 | B2 | 12/2013 | Schneider |
| 8,635,340 | B1 | 1/2014 | Schneider |
| 2001/0052016 | A1 | 12/2001 | Skene et al. |
| 2002/0010682 | A1 | 1/2002 | Johnson |
| 2002/0091327 | A1 | 7/2002 | Rosenheimer |
| 2002/0091827 | A1 | 7/2002 | King et al. |
| 2003/0177149 | A1 | 9/2003 | Coombs |
| 2004/0167982 | A1 | 8/2004 | Cohen et al. |
| 2004/0199608 | A1 | 10/2004 | Rechterman et al. |
| 2004/0199620 | A1 | 10/2004 | Ruiz et al. |
| 2005/0102354 | A1 | 5/2005 | Hollenbeck et al. |
| 2006/0031385 | A1 | 2/2006 | Westerdal |
| 2006/0085478 | A1 | 8/2006 | Landau et al. |
| 2007/0130284 | A1 | 6/2007 | Stahura |
| 2007/0130316 | A1 | 6/2007 | Turakhia |
| 2007/0156781 | A1 | 7/2007 | Kapoor et al. |
| 2007/0271393 | A1 | 11/2007 | Wong |
| 2008/0010365 | A1 * | 1/2008 | Schneider ............ G06Q 10/109 709/223 |
| 2008/0016233 | A1 | 1/2008 | Schneider |
| 2008/0034211 | A1 | 2/2008 | Shull et al. |
| 2008/0059607 | A1 | 3/2008 | Schneider |
| 2008/0098084 | A1 | 4/2008 | Volz et al. |
| 2008/0243954 | A1 | 10/2008 | Augenstein et al. |

OTHER PUBLICATIONS

"Chapter 4. Advanced DNS Features." Feb. 1, 2002. 12 pages. https://docs.freebsd.org/doc/8.0-RELEASE/usr/share/doc/bind9/arm/Bv9ARM.ch04.html.*

Florian Weimer, "Passive DNS Replication", FIRST Conference on Computer Security Incident, 2005, pp. 1-13.

marcaria.com, ". TEL Domain Registry Announces Backup and Restore for .tel Domains", 2009, http://blog.marcaria.com/domains/tel-domain-registry-announces-backup-and-restore-for-tel-domains/, pp. 1-2.

International Search Report and Written Opinion of PCT Application No. PCT/US2010/048092, dated Oct. 28, 2010, pp. 1-8.

ICANN. "ICANN gTLD Registry Failover Plan", <http://www.icann.org/en/news/announcements/announcement-3-15jul08-en.htm>, Jul. 2008, pp. 1-11.

ICANN. "ICANN gTLD Registry Failover Exercise After Action Report", <www.icann.org/en/resources/registries/ . . . /icann-aar-06apr08-en.pdf>, Apr. 2008, pp. 1-22.

Fiona Alexander et al., "DNSSEC and the Authoritative Root Zone", <http://csrc.nist.gov/groups/SMA/ispab/documents/minutes/2009-04/ispab_falexander-tpolk_april2009.pdf>, Apr. 2009, pp. 1-25.

ICANN. Registrar Data Escrow Specifications RDE Specifications, <www.icann.org/rde-specs-09nov07.pdf>, Nov. 2007, pp. 1-8.

"ICANN's gTLD Registry Data Escrow Requirements", https://archive.icann.org/en/tlds/data-escrow-report05mar07.htm, Mar. 2007, pp. 1-6.

IANA TLD Modification Template v1.4, http://web.archive.org/web/20080513151339/http://www.iana.org/domains/root/tld-change-template.txt, May 2008, pp. 1-4.

Extended European Search Report dated Jun. 2, 2017, European Application No. 10816006.0, pp. 1-9.

Patrick Jones, "Draft ICANN gTLD Registry Failover Plan—Best Practices Recommendations", Retrieved from the Internet: https://www.icann.org/en/system/files/files/draft-plan-best-practices-20-oct-07-en.pdf, Oct. 20, 2007, pp. 1-13.

Andrew McMillian et al., "Shared Registry System—Technical Architecture", InternetNZ, Retrieved from the Internet: http://dnc.org.nz/content/srs_tech_architecture-v1.2.pdf, May 23, 2002, pp. 1-56.

European Office Action issued in corresponding European Patent Application No. 10 816 006.0 dated Aug. 23, 2019, pp. 1-5.

* cited by examiner

METHOD AND SYSTEM FOR RECOVERY OF A FAILED REGISTRY

RELATED APPLICATIONS

This application is a continuation of U.S. patent application Ser. No. 12/556,456, filed Sep. 9, 2009, entitled "METHOD AND SYSTEM FOR RECOVERY OF A FAILED REGISTRY," the entire contents of which is incorporated herein by reference in its entirety.

BACKGROUND OF THE INVENTION

The Domain Name System (DNS) is the part of the Internet infrastructure that translates human-readable domain names into the Internet Protocol (IP) numbers needed to establish TCP/IP communications over the Internet. That is, DNS allows users to refer to web sites, and other resources, using easier to remember domain names, such as "www.en.example.com," rather than the numeric IP addresses, such as "123.4.56.78," which are machine readable addresses used by software to communicate with computers on the Internet. Each domain name is made up of a series of character strings (labels) separated by dots. The right-most label in a domain name is known as the "top-level domain" (TLD). Examples of well-known TLDs are ".com"; ".net"; ".org." etc. Each TLD supports second-level domains, listed immediately to the left of the TLD, e.g., "example" in "www.example.com." Each second-level domain can include a number of third-level domains located immediately to the left of the second-level domain, e.g., "en" in "www.en.example.com." There can be additional level domains as well, with virtually no limitation. For example, a domain with additional domain levels could be "www.landscape.photos.example.com."

It should be noted that a single IP address, e.g., a single server, can support numerous domain names. That is, different domain names may resolve to the same server, that can then determine what content to provide based on the requested domain name and/or additional non-domain information. This is sometimes referred to as virtual hosting.

Additional non-domain information may be included in a Uniform Resource Identifier ("URI") structure that includes the domain name. For example, a "path" part is a sequence of segments separated by a forward slash ("/"). This information may be included immediately to the right of the domain name, such as the "blog" in "www.example.com/blog/today.htm," and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page.

The Internet Corporation for Assigned Names and Numbers ("ICANN") is responsible for managing the assignment of domain names and IP addresses. The responsibility for operating each TLD is delegated by ICANN to an organization known as a domain name registry operator. ("registry"). For example, VeriSign, Inc. is the registry operator for the .com TLD. Each registry operator maintains a registry database of all domain names registered in a top-level domain for which it is responsible. A registry database record can map a domain name to an IP address of a name server. When a domain name query is submitted to the registry, the registry returns the IP address of the name server, which can contain another record with further address information about the Internet resource that corresponds to the queried domain name. The process of responding to a domain name query with an IP address is called "resolving" the domain name.

The actual registration of domain names is performed by companies referred to as domain name registrars ("registrars"). Registrars register domain names with registries. For example, an end user submits to a registrar a domain name for registration and provides an IP address to which the domain name should resolve. The registrar communicates with the registry to create a registry database record that can be used to resolve the domain name to the IP address provided by the end user and indicates the identity of the registrar through which the domain name was registered. Except for the expiration of the domain name registration at the registry, only the registrar designated in the domain name record at the registry can modify or delete registry database information about a domain name. An end user can switch registrars by following certain domain transfer procedures.

A zone file is a text file that describes a portion of the domain name system (DNS) called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data such as the IPv4 address for A records. Comments can be included by using a semi-colon and lines can be continued by using parenthesis. There are also file directives that are marked with a keyword starting with a dollar sign.

The WHOIS system is a query/response protocol that is used for querying a database in order to determine the owner of a domain name, an IP address, or an autonomous system number on the Internet. Traditionally, WHOIS lookups were made using a command line interface. However, several simplified web-based tools currently exist for looking up domain ownership information using the WHOIS system. Typically, when a user queries the WHOIS system, a web-based WHOIS client will utilize the WHOIS protocol to connect to a WHOIS server. Lookups of the requested information will then be returned to the user. The WHOIS system provides a number of useful functions including providing contact information for network operators and administrators. Additionally, using the WHOIS system, a user is able to determine the availability of a particular domain name.

As new generic TLDs are introduced, there is heightened concern over possible service disruptions that could be caused by the failure of a registry. The failure of a registry, either as a result of a malicious attack or due to business-related issues, would likely disrupt the operation of the DNS and could potentially erode the public's confidence in the DNS and the internet Thus, there is a need in the art for improved methods and systems for recovering a failed registry.

SUMMARY OF THE INVENTION

The present invention relates generally to computer networks. More specifically, the present invention relates to methods and systems for recovery of a failed registry. Merely by way of example, the invention has been applied to a system that archives zone files and bulk WHOIS data prior to registry failure. After registry failure, the zone files are validated and published, enabling an emergency root zone change to be initiated. The methods and techniques can be applied to other computer networks and database systems.

According to an embodiment of the present invention, a method of recovering a registry is provided. The method includes accessing a plurality of registry zone files for the registry and archiving, on a first periodic basis, the plurality of registry zone files. Each of the registry zone files comprises at least domain names, registrar IDs, and status information represented in a first predetermined format. The method also includes accessing bulk WHOIS data for the registry and archiving, on a second periodic basis, the bulk WHOIS data. The bulk WHOIS data comprises at least nameserver server names, IP addresses, and status information represented in a second predetermined format. The method further includes validating one of the plurality of archived registry zone files based on a comparison between the plurality of registry zone files and the bulk WHOIS data, publishing the validated registry zone file to a second registry's nameservers, initiating a root zone change request, and updating authoritative nameservers.

According to another embodiment of the present invention, a system for recovering a failed registry is provided. The system includes a first database operable to store a plurality of zone files associated with a first registry and a second database operable to store a bulk WHOIS file associated with the first registry. The system also includes a validation module coupled to the first database and the second database, a communications module coupled to the validation module and an entity in communications with a root zone authority, and one or more nameservers operable by a second registry.

According to an alternative embodiment of the present invention, a method of forming a registry database associated with a failed registry controlled by an entity is provided. The method includes providing a zone file and providing a WHOIS data file. The method also includes receiving, from the entity, a notification related to failure of the failed registry and receiving escrow data from at least one of the entity or a third party. The escrow data includes a full deposit and one or more incremental updates. The method further includes initializing the registry database based on the full deposit, updating the registry database based on the one or more incremental updates, and validating the registry database using at least one of the zone file and the WHOIS data file.

Many benefits are achieved by way of the present invention over conventional techniques. For example, embodiments of the present invention provide methods to rapidly recover a registry that has failed as a result of a natural disaster. The methods and systems described herein can be implemented as a component of a registry insurance system to smoothly transition operations after a catastrophic failure. Since during a failure of a registry, registrars and existing domain names will be adversely impacted, embodiments will reduce the downtime of the failed registry, resulting in a reduction of the impacts on customers, improved business continuity assurance for organizations that rely on domain name availability, and an increase in the confidence that users have in registries and domain name based services on the Internet in general. These and other embodiments of the invention along with many of its advantages and features are described in more detail in conjunction with the text below and attached figures.

DETAILED DESCRIPTION OF SPECIFIC EMBODIMENTS

Figure 1:
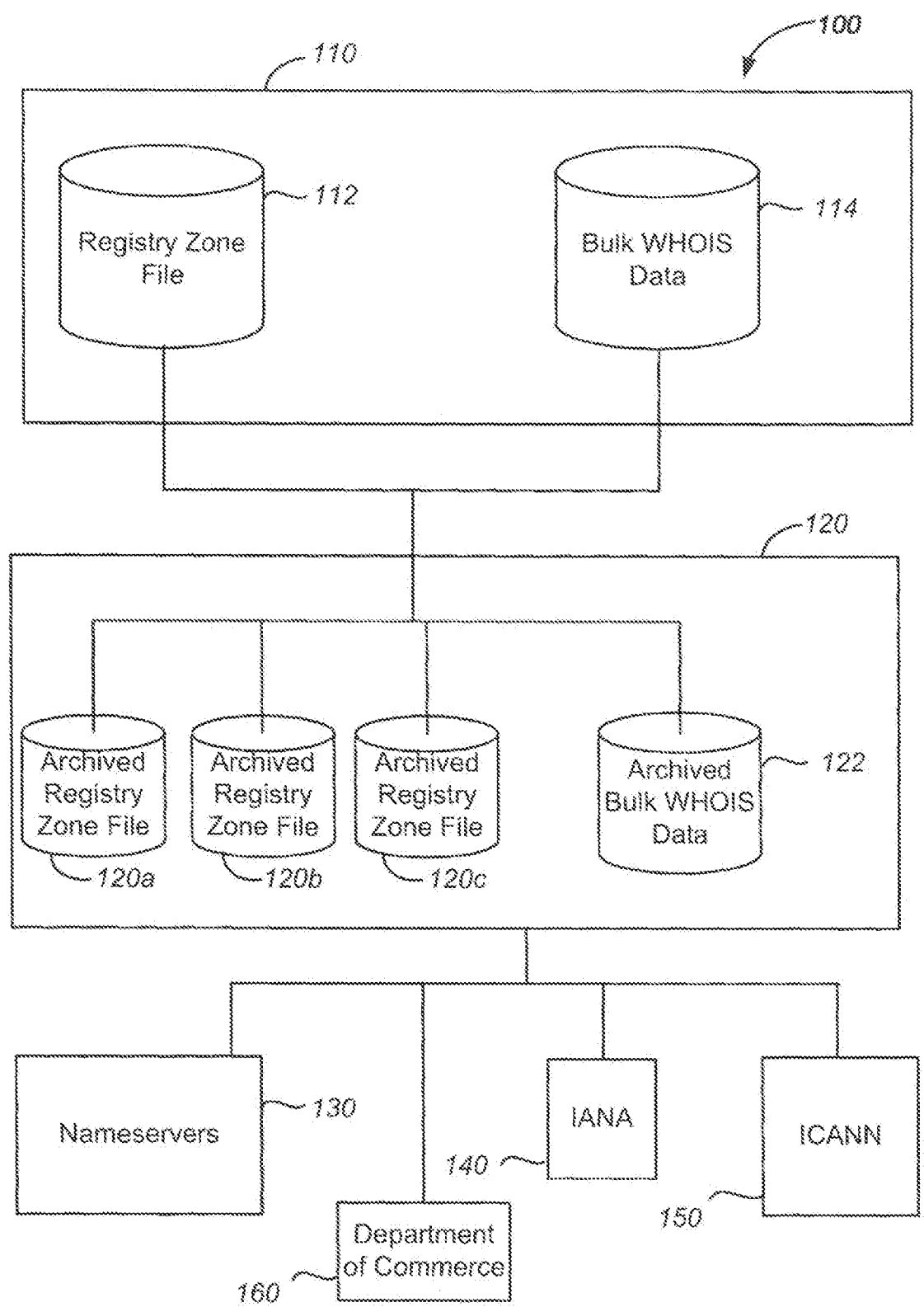
FIG. 1 is a simplified schematic diagram of a registry recovery system according to an embodiment of the present invention.

The failure of a registry based on either technical reasons (e.g., damage to internet infrastructure) or business reasons (e.g., bankruptcy of a registry) can result in loss of registry functions until the registry is recovered. The inventors have determined that known methods and systems needed to rapidly recover the functionality of the registry and thereby restore critical registry services are likely to prove insufficient. Thus, embodiments of the present invention provide methods and systems to rapidly recover registry functions, preventing erosion of the reputation of the failed TLD, which could result in a decrease in public confidence in the domain name space.

Utilizing embodiments of the present invention, the registry recovery process can quickly migrate critical operations to recover the failed registry either through coordination with the registry operator or as a component of an approved/required ICANN registry failover process. As described more fully throughout the present specification, methods and systems for archiving zone files and bulk WHOIS data, validating a zone file, publishing the validated zone file, and initiating an emergency root zone change are provided. Utilizing embodiments of the present invention, a registry can be recovered by a third party, ensuring that registry services will continue to be provided despite the failure of the registry. Thus, embodiments provide a registry assurance function not available using conventional systems and techniques.

The present invention is suitable for use by a variety of users. As an example, ICANN could benefit from the use of the present invention and could potentially increase the public's confidence in the internet by integrating the registry failover processes described herein into requirements promulgated by ICANN. By instituting a standardized registry failover process, a third party (e.g., existing registries) would be able to rapidly restore registry operations for a failed registry. Another example of a user that could benefit from the use of the present invention would be existing registry operators desiring methods and systems to smoothly transition operations prior to a catastrophic failure. Such a registry operator could enter into a backup registry operator agreement with a third party (e.g., another existing registry operator) or could purchase registry recovery services provided in accordance with embodiments of the present invention on an "on-demand" basis. A registry operator can also use embodiments of the present invention to smoothly transition from one system to another, even in the absence of an external disruption, such as a natural or manmade disaster, insolvency, or the like.

Currently, the transition of registry services from one operator to another requires at least two cooperating parties: the existing registry operator and a recovery registry operator. If the existing registry operator is not cooperative, either for a hostile reason or based on a non-functioning behavior of the registry operator, the timeliness with which critical services can be restored can be adversely impacted. The inventors have determined that without a failed registry recovery system in place, including well-defined processes and systems, the transition of critical services from a failed registry could take many weeks or months, if the recovery operation is possible. According to embodiments of the present invention, recovery operations are performed while minimizing data corruption and/or loss. Thus, during recovery operations, methods and systems for extracting and reconstituting the registry data from escrow are utilized to prevent data corruption and/or loss.

Embodiments of the present invention address the full spectrum of potential registry failures, including those due to business failure of the registry operator or technical failures. The registry recovery operations covered by the invention can provide either partial domain resolution services in the event of a DNS failure in resolution systems or complete failure recovery services including both domain name resolution and provisioning systems. Although embodiments of the present invention are directed to TLD registry recovery operations, the invention is applicable to other registries, for example, the root zone registry or other name spaces that maintain escrowed data.

At a high level, a registry recovery process performed according to an embodiment of the present invention includes at least three phases:

1. Phase 0. Normal Operations—Archiving of zone files and bulk WHOIS data
2. Phase 1. Registry Recovery after Failure
3. Phase 2. Resumption of Publication of WHOIS Data The phases listed above will be described in more detail throughout the present specification, for example, with respect to FIG. 4. The following discussion is provided as an overview and additional phases can be utilized in other embodiments of the present invention. For example, Phase 3 (reconstruction of the authoritative registry database from escrow data) is discussed below.

In Phase 0, prior to registry failure, the zone files and bulk WHOIS data for a registry can be archived. In the present specification, the registry that will fail or has failed is referred to as a failed registry. Thus, although the term "failed registry" is in the past tense, this term is equally applicable to a registry that will fail at a time in the future. As an example, archiving of zone files from a "failed registry" is performed prior to failure, so that the past tense of the term does not limit the time when the interaction with the failing/failed registry occurs. In Phase 0, the failed registry's recent TLD zone files are archived. The archiving of these zone files can be facilitated by the public availability of the zone files as defined by the registry zone file access agreements. The bulk WHOIS data files can also be available, either through ICANN or from a designated third party.

The downloading and archiving of the registry zone files for the failed registry can be performed on a periodic or aperiodic basis, for example daily and performed in accordance with the terms of registry zone file access agreements. The data in the zone files includes Domain Names, Nameserver, and IP addresses in standard zone file format.

In addition to the zone files, there may be secondary data sources that can be downloaded and archived by the recovery registry operator. This secondary data could include data related to specific functions or operations performed by a particular registry operator. As described below, different registries can provide different services in addition to DNS resolution services. In order to provide these additional services, the registries will ordinarily maintain data in addition to the data used to perform the DNS resolution function.

As an example, the .name TLD registry, in addition to normal DNS resolution functions, also provides services including email forwarding and defensive registration. In performing these additional services, the .name registry maintains additional data as appropriate to these additional functions. Thus, in addition to the zone files for the .name TLD, an embodiment of the present invention applicable to the .name TLD can download and archive additional data unique to this particular registry and that is stored by the registry in order to perform functions specific to the registry. For other particular registries, additional data in addition to the zone files can be downloaded and archived as appropriate to the particular functionality provided by the particular registry. One of ordinary skill in the art would recognize many variations, modifications, and alternatives. For recovery registries archiving second data sources, validation of the zone files can additionally include validation of the secondary data, either comparing the secondary data to previously archived secondary data, comparing portions of the secondary data to portions of the zone file, or the like.

The bulk WHOIS data is also downloaded and archived on a periodic or aperiodic basis (e.g., daily, at various times, etc.) by either ICANN or a third party that ICANN has previously identified based on registry agreements that provide for availability of bulk WHOIS on a periodic (e.g., daily) or aperiodic basis. The bulk WHOIS data includes Domain Names, Nameserver, IP addresses, Status, Contact data, including Registrar, Registrant (for thick registries), Creation, Modification, and Expiration Dates in standardized format specified in registry agreements.

In Phase 1, after failure occurs, the failed registry can be recovered. In an embodiment, after DNS services on the failed registry operator's TLD nameservers have ceased operation, the recovery registry operator, also referred to as a disaster recovery registry, can:

1. Validate a zone file for the failed registry. As described below, validation of the zone file includes confirming the data in the last known valid zone file based on a comparison between the most recent zone file and the previous zone file(s) and/or the most recent or previous WHOIS file(s). If the most recent zone file fails the validation process, then the recovery registry operator will revert to previous zone files until a zone file meets the validation criteria. In some embodiments, validation can also be performed prior to failure of the failed registry.
2. Publish the validated zone file to the recovery registry operator's nameservers.
3. Coordinate an emergency root zone change with IANA to update the authoritative TLD nameservers.

Upon completion of Phase 1, the failed registry's DNS will operate in the last known good state based on the reconstitution of the authoritative registry database. The recovery of the failed registry can thus be performed rapidly and with minimal impact on users.

After recovery of the DNS resolution functionality, Phase 2 is initiated in order to restore additional functionality originally provided by the failed registry. Services restored in Phase 2 include resumption of the publication of WHOIS data, thereby making such data accessible. The recovery registry can create a registry database from available WHOIS data. This enables the registry operator to resume publication of WHOIS data and associate each domain name with the registrar of record, a service which was lost as one consequence of the failure of the failed registry. The publication of the WHOIS data can be used to authenticate and coordinate emergency changes to the zone file. As described below, the bulk WHOIS data files can be made available through ICANN or a third party designated by ICANN that receives a daily update to the bulk WHOIS data. Additionally, some registries may have other resolution services, such as email forwarding, that can be restored as part of the actions taken in Phase 2. This can be done, for example, by relying on one or more archived email forwarding files that contain records containing the original addresses correlated to their forwarding addresses.

According to some embodiments of the present invention, other services can be restored, resumed, and/or restarted during the registry recovery process. Examples of these services include zone file access and registrar reports and billing. Additionally, transfer dispute resolution, which is a procedure governed by ICANN-defined processes can be resumed. It should be noted that registry recovery will provide a responsible registry that is able to respond to court orders, Uniform Domain-Name Dispute-Resolution Policy (UDRP) decisions, and the like. Moreover, other TLD specific registry services that are approved by ICANN can be resumed as part of the processes described herein. For examples of other services that are facilitated by registry recovery, see the Registry Services Evaluation Process (RSEP) including services listed at the ICANN website.

The WHOIS data is useful in making changes to the registry data. An example is enabling the servicing of change requests. If a registrant has a domain name and wants their registrar to remove that domain name as a result of an operational issue encountered by the registrant or the registrar, a process is provided by the registry to either remove or perform an update to the existing name. In order to authenticate the entity that is authorized to request such a removal/update, embodiments of the present invention restore the WHOIS data in addition to restoration of the zone files for the failed registry. In Phase 2, the WHOIS data, from the bulk WHOIS data, can be used to determine the registrar of record for the particular domain name of interest. Since all registrations have to come through an ICANN-accredited registrar, verification of the WHOIS data will enable the registry to authenticate the requester as the appropriate registrar for the domain name of interest, preventing another registrar from successfully initiating a change request.

As will be evident to one of skill in the art, at least some of the information contained in the bulk WHOIS file is generally also present in the registry database. Archiving of the WHOIS data is still useful since, if the escrow data eventually used in some portion of the registry recovery process is corrupt, the WHOIS data can be used in making changes such as emergency changes to the registry database, which can be useful in maintaining service levels until full recovery is accomplished.

Typically, the recovery of the WHOIS data and use in processing change requests will be limited to non-routine change requests, e.g., emergency situations. Routine changes encountered during normal operation of the registry will typically be postponed until the full recovery of the failed registry based on escrow data, which is described more fully throughout the present specification.

FIG. 1 is a simplified schematic diagram of a registry recovery system according to an embodiment of the present invention. The registry recover system 100 includes a failed registry 110, a recovery registry 120, and other system elements. As discussed above, the term "failed registry" includes registries that will fail as well as registries that have failed. As examples, the registry operator could fail for technical or financial reasons or ICANN could decide that another registry operator should perform the functions initially performed by the current registry operator. Thus, embodiments of the present invention can provide systems appropriate to conditions in which a current registry operator is uncooperative during the registry recovery process.

Failover systems for registries present interesting and unique problems in the context of recovery for the registry. In a typical backup and recovery operation, the user backs up data and then can recover it later. In these typical operations, the user has full information related to the data that was initially backed up, providing guidance regarding the restore point for the recovery operation. In the case of a failed registry recovery system (i.e., a failover system for a registry), the typical backup and recovery scenario may not apply since there can be a first operator or entity that has failed (i.e., the failed registry operator) and a second entity that is performing the recovery process (i.e., the recovery registry operator) and has limited information about the current status of the registry. Accordingly, embodiments of the present invention provide methods and systems that can establish priorities for the recovery process and utilize previously archived information to recover the services originally provided by the failed registry, thereby ensuring that the failed TLD returns to active service on the Internet and is restored quickly with reliable (e.g., last-known) data. By identifying the available sources of data, determining which data is authoritative for the given data elements and/or fields, and then reconstituting services as defined under a registry agreement, recovery of a failed registry can be performed. In addition to registry agreements, appropriate authorization for the recovery process can be provided by the organization authorized to direct a registry operator to manage the operation of a TLD.

Referring to FIG. 1, each registry operator (i.e., registry) maintains a registry zone file 112 for the TLD operated by the registry operator. The zone file is a text file that describes a DNS zone. The zone file contains information that defines mappings between domain names and IP addresses and other resources, organized in the form of resource records (RR). ICANN specifies that each registry escrows the data in the zone file 112 in a publicly accessible format and provides a zone file access program in order to make the zone files publicly accessible. The recovery registry 120, which may be a registry for another TLD, can download and archive the publicly available zone files on a periodic basis, for example, on a daily basis. In FIG. 1, three archived registry zone files 120a, 120b, and 120c are illustrated, but it will be appreciated that the number of archived zone files can be less than or more than three. As an example, seven zone files representing the previous week could be maintained by the recovery registry. Thus, by downloading and archiving the zone files for the failed registry before failure, the recovery registry has access to recent zone files for the failed registry prior to failure. As will be described more fully throughout the present specification, the archived zone files can be used by the recovery register to resolve the TLD initially operated by the failed registry.

As illustrated in FIG. 1, the failed registry also maintains bulk WHOIS data 114. The recovery registry can archive the bulk WHOIS data in a manner similar to the archiving of the zone file data. A single archived bulk WHOIS data file 122 is illustrated in FIG. 1, but additional archived bulk WHOIS data files are archived by embodiments of the present invention.

Although ICANN is discussed herein as the organization responsible for the exemplary TLDs, other entities or organizations controlling and managing assignment of registries for TLDs are included within the scope of the present invention. As an example, ICANN controls registries for .com and .net, while .gov is managed by the U.S. General Services Administration (GSA) and .edu is controlled by the U.S. Department of Commerce. Other entities control registries for .fr and .cn. In registry recovery systems for these other TLDs, access to data and coordination with the controlling entity in relation to registry failure can be performed in place of the interactions with ICANN.

Figure 2:
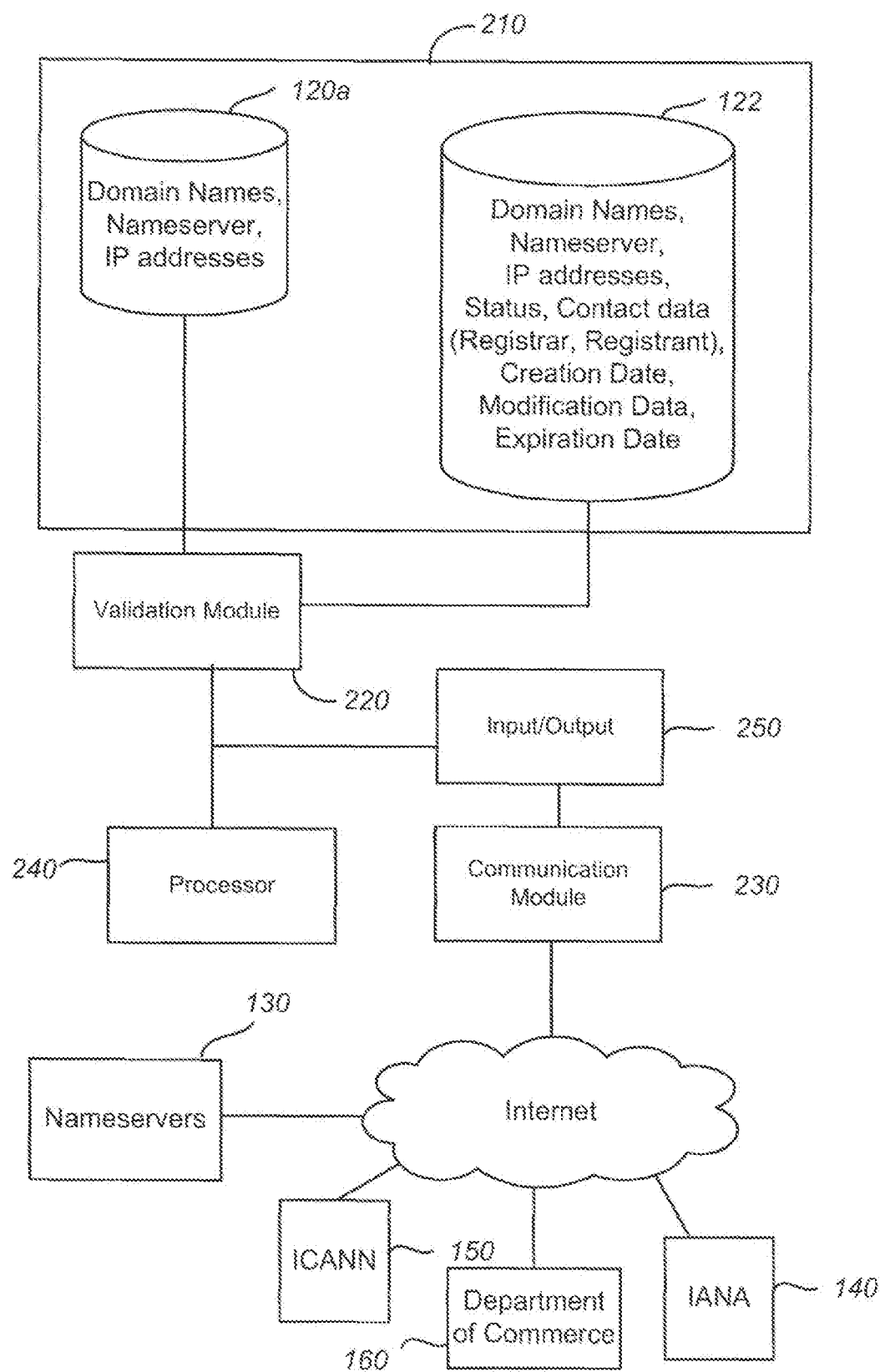
FIG. 2 is a simplified schematic diagram of elements of a recovery registry according to an embodiment of the present invention.

FIG. 2 is a simplified schematic diagram of elements of a recovery registry according to an embodiment of the present invention. The recovery registry database 210 includes one or more archived zone files 120a and one or more archived bulk WHOIS data files 122. The database can be any device capable of storing digital information, such as RAM, flash memory, a hard disk, a CD, etc. The database storing these archived files can be a single database, multiple geographically distributed databases, or the like. In the embodiment illustrated in FIG. 2, the zone file includes domain names, nameserver, and IP addresses. The WHOIS data file includes domain names, nameserver, IP addresses, status, contact data for the registrar and registrant, creation date, modification date, and expiration date. The information illustrated as stored in these databases is provided as an example and other types of information are stored in alternative embodiments.

The recovery registry database 210 is in communication with validation module 220. The validation module is used by the recovery registry operator to validate the zone files as well as the WHOIS data files. Additional discussion related to validation is provided in reference to FIG. 5. The recovery registry database 210 is also in communication with processor 240, input/output module 250, and communication module 230. The processor 240 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like. The processor 240 is coupled to the database 210 in order to access the stored information for use during the validation process.

The input/output module 250 is used to provide for interaction with system operators and the like. The communications module 230 enable communication through the internet between the recovery registry operator and other entities including IANA 140, ICANN 150, the Department of Commerce 160, and nameservers 130 controlled by the recovery registry operator. Although internet communications are illustrated in FIG. 2, other forms of communications are included within the scope of the present invention, including telephone, facsimile, and the like.

Figure 3:
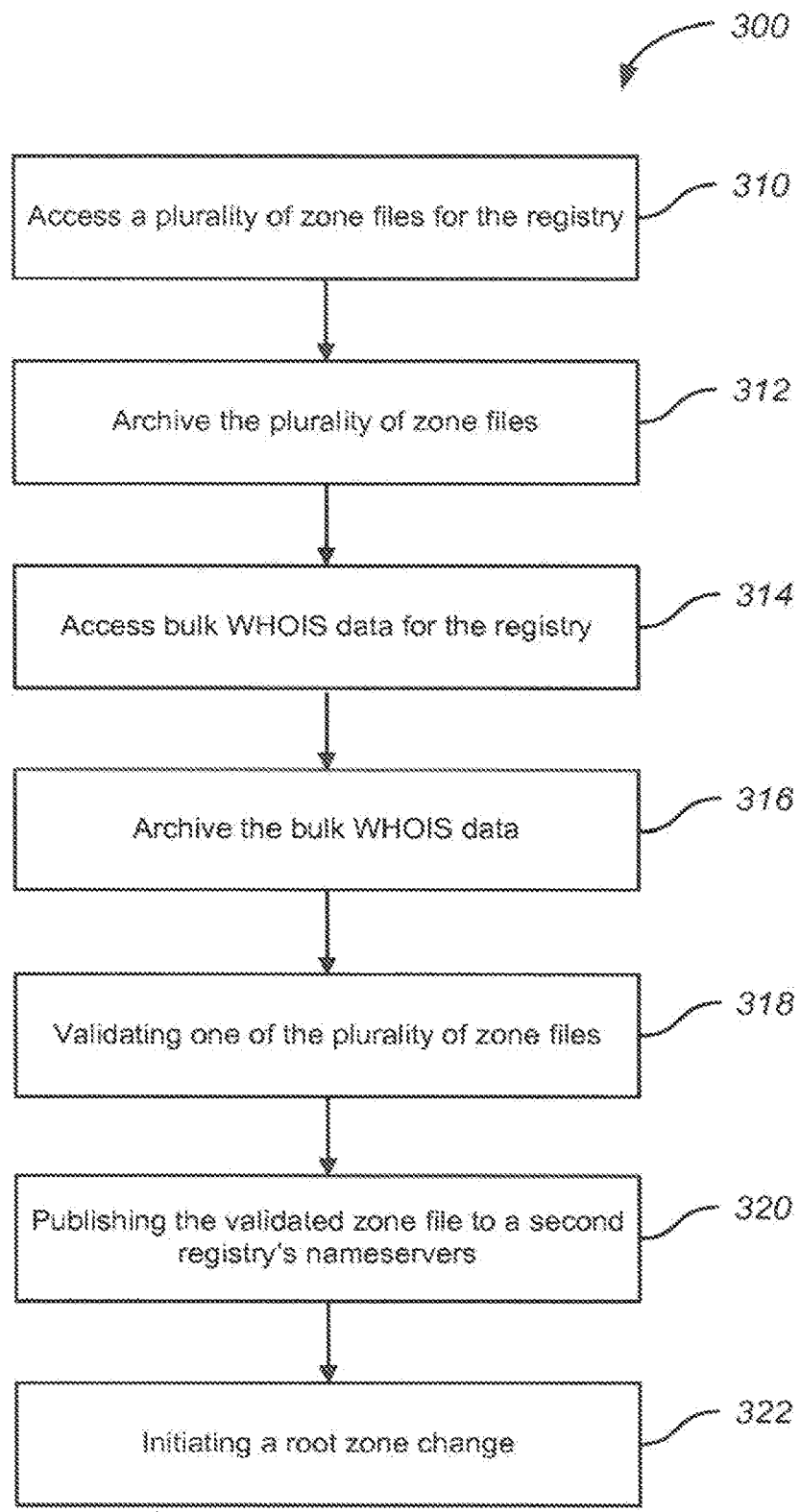
FIG. 3 is a simplified flowchart illustrating a method of recovering a failed registry according to an embodiment of the present invention.

FIG. 3 is a simplified flowchart illustrating a method of recovering a failed registry according to an embodiment of the present invention. The method 300 includes accessing a plurality of zone files for the registry that will fail (310), which is referred to as the failed registry. The zone files for the failed registry are publicly available and are archived by the recovery registry (312). The archiving of the zone files is performed on a periodic basis, for example, daily. Thus, a plurality of zone files are archived by the recovery registry, which could be a registry of another TLD. Alternatively, zone files can be downloaded and archived in a near real-time manner using an update service such as VeriSign's Domain Name Zone Alerts (DNZA) service. The DNZA service is provided as an implementation of the "DNS Update Service" (Proposal #2007003) listed in the RSEP at the ICANN website corresponding to (See letter dated Mar. 22, 2007 to Dr. Paul Twomey. President and C.E.O. of ICANN, from VeriSign. Inc. with subject line "Notice of New Service and Request for Preliminary Determination"; letter dated Apr. 11, 2007 to VeriSign from Patrick Jones of ICANN with the subject line "Proposal #2007003, DNS Update Service"; and memo entitled "VeriSign Application for Registry Service: 'Rapid Zone Updates'", all available at the ICANN website). The DNZA enables customers to access all updates to the registry every five minutes in addition to the once per day update of the full zone files.

Additionally, the bulk WHOIS data for the registry can be accessed (314) and archived (316). ICANN specifies that every registry operate a WHOIS service. WHOIS is an individual query system enabling a user to query the WHOIS data maintained by the registry and look up the results of a single name. In addition, each registry maintains a full WHOIS file, referred to as a bulk WHOIS file. By agreement, ICANN has access to the bulk WHOIS file. That is, each registry makes a full downloadable copy of the registry WHOIS available to ICANN, making it possible for ICANN to download the bulk WHOIS file on a daily basis. In addition to ICANN having access to the bulk WHOIS file, ICANN has the right, by agreement, to designate a third party to have access to the bulk WHOIS file. Thus, either ICANN or a third party (by designation), could download and archive the bulk WHOIS file on a periodic basis. In a specific embodiment of the present invention, ICANN designates a third party as a recovery registry (also referred to as a backup registry operator or an insurance registry operator). The designated third party collects the WHOIS data on a regular basis and archives the data. Of course, ICANN could collect the data independently. Upon failure, the designated third party will thus have archived bulk WHOIS data available for use in recovering the functionality of the failed registry. It should be noted that the bulk WHOIS data is separate from escrow data, which typically includes data not included in the bulk WHOIS date file.

The WHOIS file can be made available to the recovery registry in this embodiment on a regular basis in order to conduct periodic comparison and validation of Domain Name data (domain name, nameservers, IP addresses, and the like) between the zone files and the WHOIS file. Due to the nearly continuous updating of registry data, small differences in the creation time for the two data files are expected, but variations should be limited to changes in which the modification date is the same as the file generation date. Generally, other discrepancies are reconciled manually.

In a specific embodiment, in resolving differences between the zone files and the WHOIS data, the zone file will take precedence because the zone file provides the data enabling domain names to resolve on the Internet. These operations are performed in relation to Phase 0 of the registry recovery process and are performed prior to failure of the registry.

Although FIG. 3 illustrates a method in which the recovery registry downloads and archives the zone file information and bulk WHOIS file on a periodic basis, other embodiments can provide a method in which another party downloads and/or archives the zone file information and the bulk WHOIS data, validates the zone files using archived zone files and/or WHOIS data, and then passes this data to the recovery registry for validation after failure of the failed registry. Thus, although the method in FIG. 3 is performed by a single entity, multiple entities could be involved in practicing the method of variations on the method that provide the result of recovering the failed registry. As an example, ICANN could designate a third party that would archive the bulk WHOIS information for several (or all) of the registries established by ICANN, along with the zone file information for these registries. During normal operation, the files would be downloaded and archived. Upon failure of a registry, the data would be passed to the recovery registry, which would then proceed to recover the failed registry using data from the designated third party, data from ICANN, and/or data maintained by the recovery registry. One of ordinary skill in the art would recognize many variations, modifications, and alternatives.

According to an embodiment, a notification can be provided to the recovery registry that the initial registry has failed. This notification can come from ICANN, from the original registry, based on a periodic check of the registry by the recovery registry, or the like. In the embodiment illustrated in FIG. 3, the notification triggers validation of one of the plurality of zone files (318). In an embodiment, the most recent archived zone file is used as the validated zone file. In this embodiment, validation merely includes selecting the most recent zone file. Typically, validation includes additional data integrity checks as described below. The validated zone file is used in restoring the operation of the failed registry and thus, there is an interest in using data that is accurate. The accuracy of the data, which will typically depend on the complexity of the validation process, can range from an exact copy of the data in zone file 112 prior to failure to less accurate data, depending on the particular application. As mentioned above, the minimal amount of validation would merely check the archiving date and use the most recently archived zone file.

In some embodiments, validation of the zone files is performed prior to registry failure. In these embodiments, as the zone files are downloaded and archived (310 and 312), the validation process is performed. Thus, when it is determined that the failed registry has failed, the validation process is already completed and a validated zone file is available. As an example, in one implementation, the zone files are compared each day to determine the percent of data changed from the previous day. This comparison is performed in order to ensure that the most recent zone file is not corrupt or otherwise unusable due to accidental or intentional activity by the current registry operator. This could result, for example, when a disgruntled employee intentionally deletes a significant portion of the zone file prior to failure in an attempt to make the zone file unusable. Additional discussion related to validation is provided in reference to FIG. 5.

Once the zone file has been validated, the validated zone file is published to the recovery registry's nameservers (320). The zone files can be in a format that can be pushed out to DNS servers, simplifying the publishing process (320). The transfer of the zone files to the nameservers, which are typically deployed at a number of geographically separated locations, may be performed in a hierarchical manner.

In the event of a change that exceeds the predetermined threshold for data changes, investigation can be performed by recovery registry personnel with expertise in DNS operation. Changes exceeding the threshold may result in an increase in the number of zone files that the recovery registry maintains in order to provide sufficient data to revert back to the last known valid file.

A root zone change is initiated (322) and can be referred to a coordination of an emergency root zone change. The root zone, which is the top DNS zone of the DNS hierarchy for a given DNS system, is managed by IANA. The root zone change, which is a process coordinated between the recovery registry, IANA, and the Department of Commerce, can be performed rapidly (e.g., less than a day). Coordinating a root zone change includes a submission by the recovery registry of a list of the nameservers for which changes should be made to IANA. In turn, IANA will coordinate with the Department of Commerce, notifying the Department of Commerce that a root zone change request has been received. The Department of Commerce will review and authorize the proposed change to the nameservers. After approval or authorization of the change to the root zone, the recovery registry will push out a new root zone for the TLD operated by the failed registry. Once the change is made to the root zone, DNS queries are directed to the recovery registry's nameservers as the authoritative nameservers for the failed registry's TLD. Thus, the original registry's functionality is restored through the operation of the recovery registry. This process reestablishes the TLD registry services of the failed registry in a rapid manner that is transparent to the users of the Internet. After performing the method 300 illustrated in FIG. 3, DNS services will have been restored.

In some embodiments, one or more additional processes may be performed during the failed recovery registry process. As an example, in an embodiment, the publication of the validated zone file is verified prior to authorizing the root zone change. The verification can be performed by the recovery registry, by IANA, or by other appropriate parties.

In some embodiments, after the failed registry has been recovered and operation of the registry is ongoing using the recovery registry operator's nameservers, coordination with the failed registry operator will be undertaken to transition registry operations back to the failed registry operator. As part of this transition, registrars can be contacted and reports/data files can be provided to registrars with results of the registry recovery for all data associated with that registrar. The recovery process can then also include steps for confirmation of the data and resolution of any potential discrepancies. After the registry recovery processes described herein, full registration service is enabled with the updates being published to all resolution services.

The inventors have determined that attempting to recover a failed registry from escrow data is a time consuming process. After failure of the registry, following a process of getting approval from ICANN to extract the data from escrow, delivering the escrow data from ICANN to the recovery registry, understanding the format of the escrow data, reconstituting the escrow data into an operational database, testing the operational database, and the like, will be a slow process. During this process, the users of the TLD will not receive resolution services in the normal manner of operation. For a domain name owner that relies on their website for the success of their business, such a long delay could result in loss of business and even closure of the business. Thus, according to embodiments of the present invention, methods and systems are provided that provide for rapid recovery of the failed registry, providing benefits not available using conventional approaches.

It should be noted that although FIG. 3 only illustrates registry recovery for a single TLD, the methods and systems described herein are applicable to multiple registry operators. For example, a single recovery registry (e.g., an insurance registry operator) could download and archive zone files for multiple registries (e.g., .info, .fr, .museum, .jobs, and the like). In this example, the recovery registry would download and archive zone files and bulk WHOIS data on a periodic basis for all the registries that it has agreed or intends to recover. The periodic basis could be the same for the various TLDs or different. One of ordinary skill in the art would recognize many variations, modifications, and alternatives.

Figure 4:
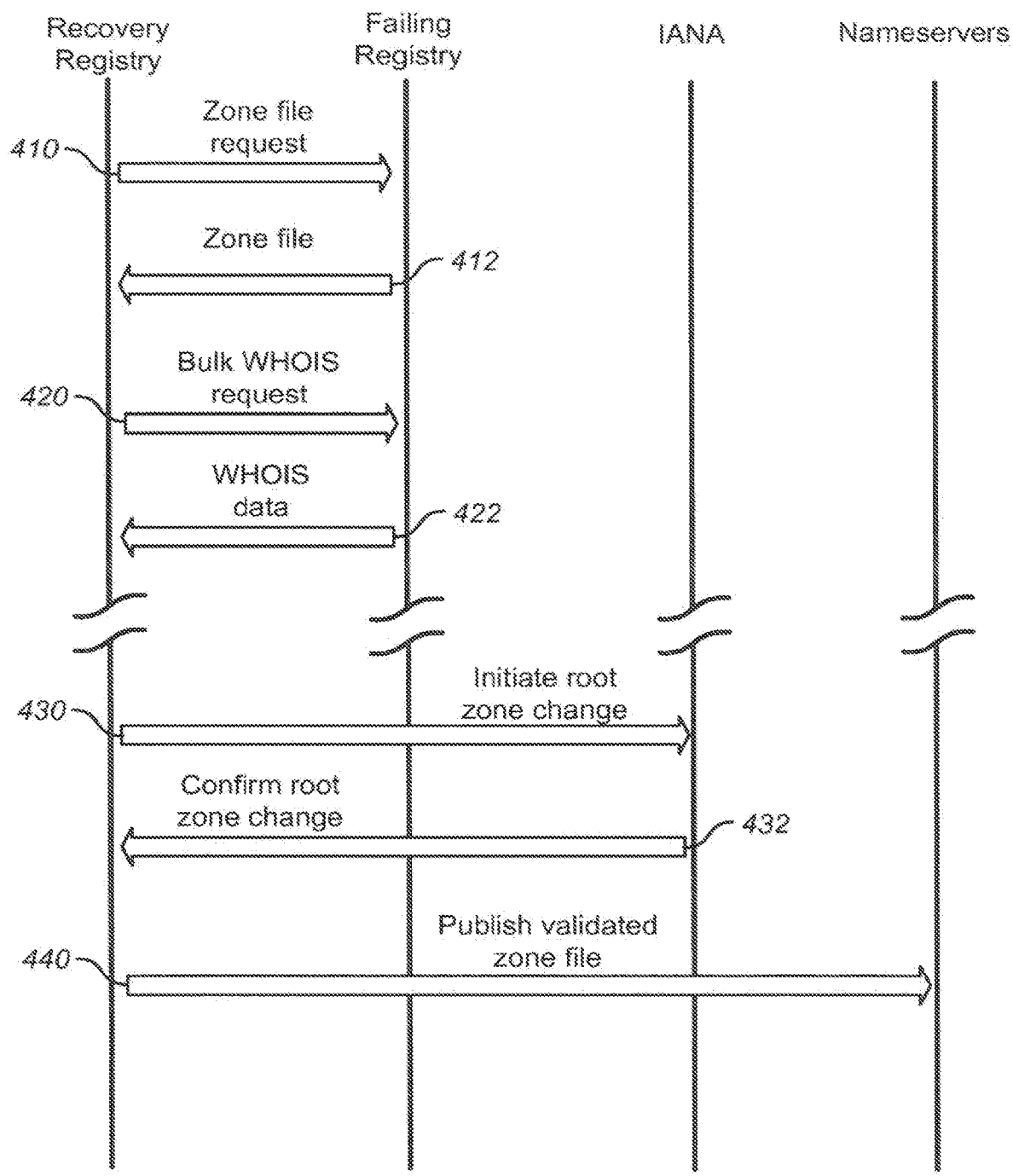
FIG. 4 is a simplified message flow diagram illustrating a method of recovering a failed registry according to an embodiment of the present invention.

FIG. 4 is a simplified message flow diagram illustrating a method of recovering a failed registry operator according to an embodiment of the present invention. The method includes a recovery registry operator requesting a zone file from a registry that will fail at some time in the future (410). The registry that will fail is referred to as a failing recovery. However, initially, the failing registry is a fully functioning registry. The methods and systems described herein can be used to provide insurance registry services, enabling the registry that will fail to be provided with backup services by the recovery registry. Such insurance can be provided as a service by the recovery registry or as a requirement from the entity controlling the registry that will fail. The zone file is provided to the recovery registry operator by the registry operator that will fail (412). The zone files provided by processes 410 and 412 are received by the recovery registry operator on a periodic basis, for example, daily. Thus, although a single request/response set is illustrated, a single request and multiple responses, multiple requests and multiple responses, and other combinations are included within the scope of the present invention.

The method also includes the recovery registry operator requesting WHOIS data from the failing registry operator (420). The WHOIS data (also referred to a bulk WHOIS file) can be provided to the recovery registry operator by the failing registry operator (422). The WHOIS data provided by processes 410 and 422 is received by the recovery registry operator on a periodic basis, for example, daily, hourly, or irregularly. The receipt and archiving of the zone files and the WHOIS data is continued for a period of time prior to the failure of the failing registry. Typically, several of the most recent zone files will be archived along with one or more of the most recent WHOIS data files. Accordingly, outdated versions of the zone files and WHOIS data can be discarded as time progresses. Validation of the zone files and the WHOIS data can be performed in this period prior to registry failure as described more fully throughout the present specification.

After the failed registry experiences failure, the method includes initiating a root zone change (430). The method can include a notification from an entity controlling the failed registry to the recovery registry that the registry has failed. Additionally, the recovery registry operator could perform regular monitoring of the registry prior to failure, enabling the recovery registry operator to detect failure in a timely fashion. The root zone change, implemented in cooperation with IANA, is one component of the process that will enable the recovery registry to provide backup registry services as described throughout the present specification.

The root zone change is confirmed (432) in the embodiment of the present invention illustrated in FIG. 4. Typically, this confirmation will be provided by the entity controlling the failed registry, for example, IANA. The validated zone file will be published to the recovery registry operator's nameservers (440), enabling DNS resolution services for the failed registry to be performed by the recovery registry.

It should be appreciated that the specific steps illustrated in FIG. 4 provide a particular method of recovering a failed registry operator according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
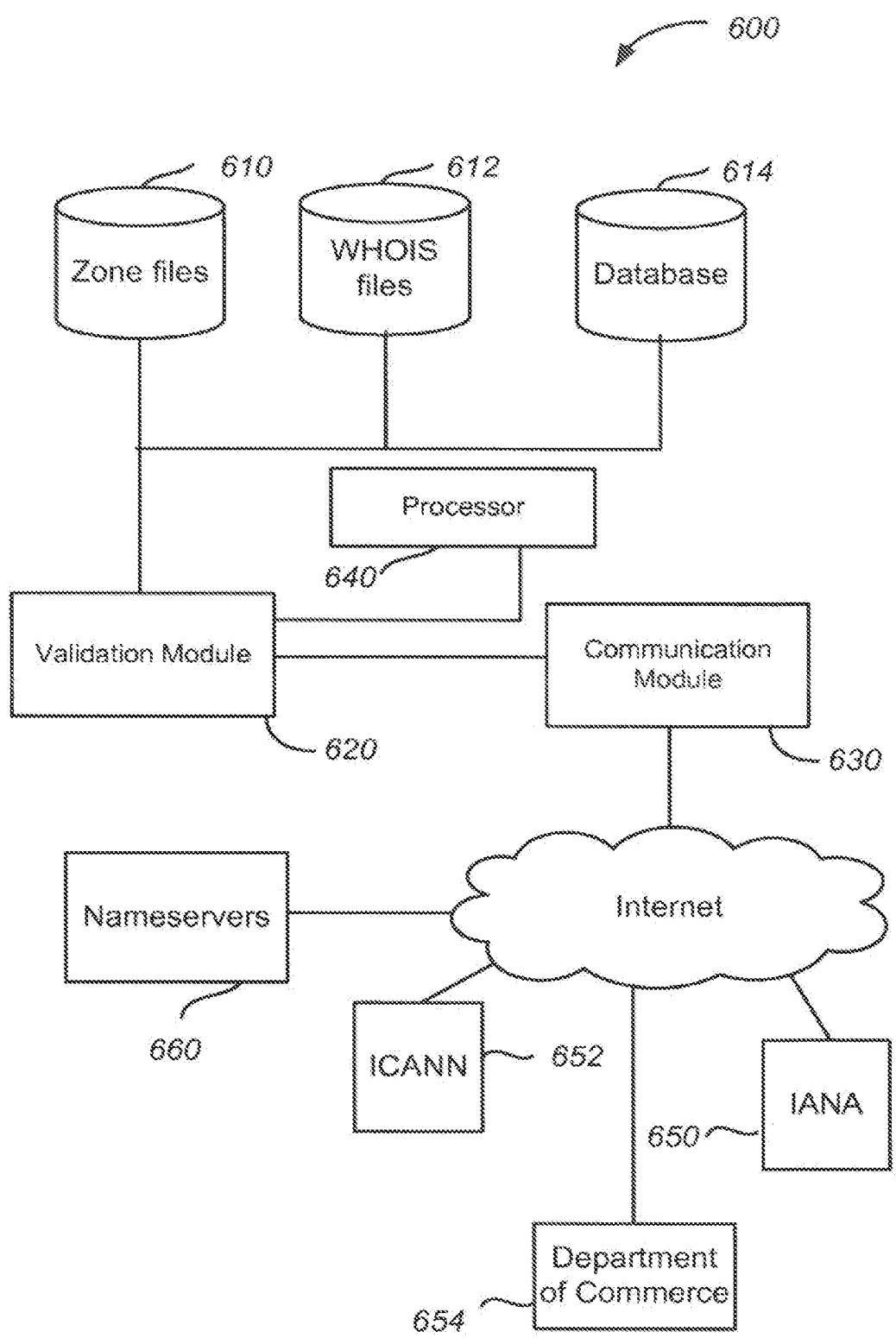
FIG. 6 is a simplified schematic diagram of elements of a registry recovery system according to an embodiment of the present invention.

FIG. 6 is a simplified schematic diagram of elements of a registry recovery system (600) according to an embodiment of the present invention. The system (600) illustrated in FIG. 6 can be used to implement the methods of registry recovery described herein, including the methods discussed in relation to FIG. 4. The system (600) includes one or more databases to include zone files 610, WHOIS files 612, and other files 614 as needed to perform the registry recovery process. The recovery registry requests and receives zone files and WHOIS data or the registry that will be recovered as described more fully throughout the present specification. The various data files, such as multiple zone files, can be stored in the zone file database 610 as they are downloaded on a periodic or aperiodic basis.

The system also includes a validation module coupled to the databases 610, 612, and 614. Using the zone files, WHOIS data, and other data as needed, the validation module 620 provides a validated zone file that can be used during the registry recovery operation. The validation can be performed in this period prior to registry failure, after failure, or combinations thereof. The system further includes a communication module 630, which is used to initiate the root zone change, and a processor 640 utilized to control one or more portions of the registry recovery process. The communications module provides connectivity to the Internet and the nameservers 660 and other entities including IANA 650, ICANN, 652, and the Department of Commerce 654. After coordination regarding the root zone change, the validated zone file can be published to the recovery registry operator's nameservers 660, enabling DNS resolution services for the failed registry to be performed by the recovery registry. Thus, the communications module is in communication with a root zone authority since IANA receives the root zone change requests from the recovery registry and submits the root zone change requests to the U.S. Department of Commerce for authorization. Once authorized, the recovery registry generates the root zone file from these authorized changes and distributes the validated zone files to all the root server operators.

Figure 5:
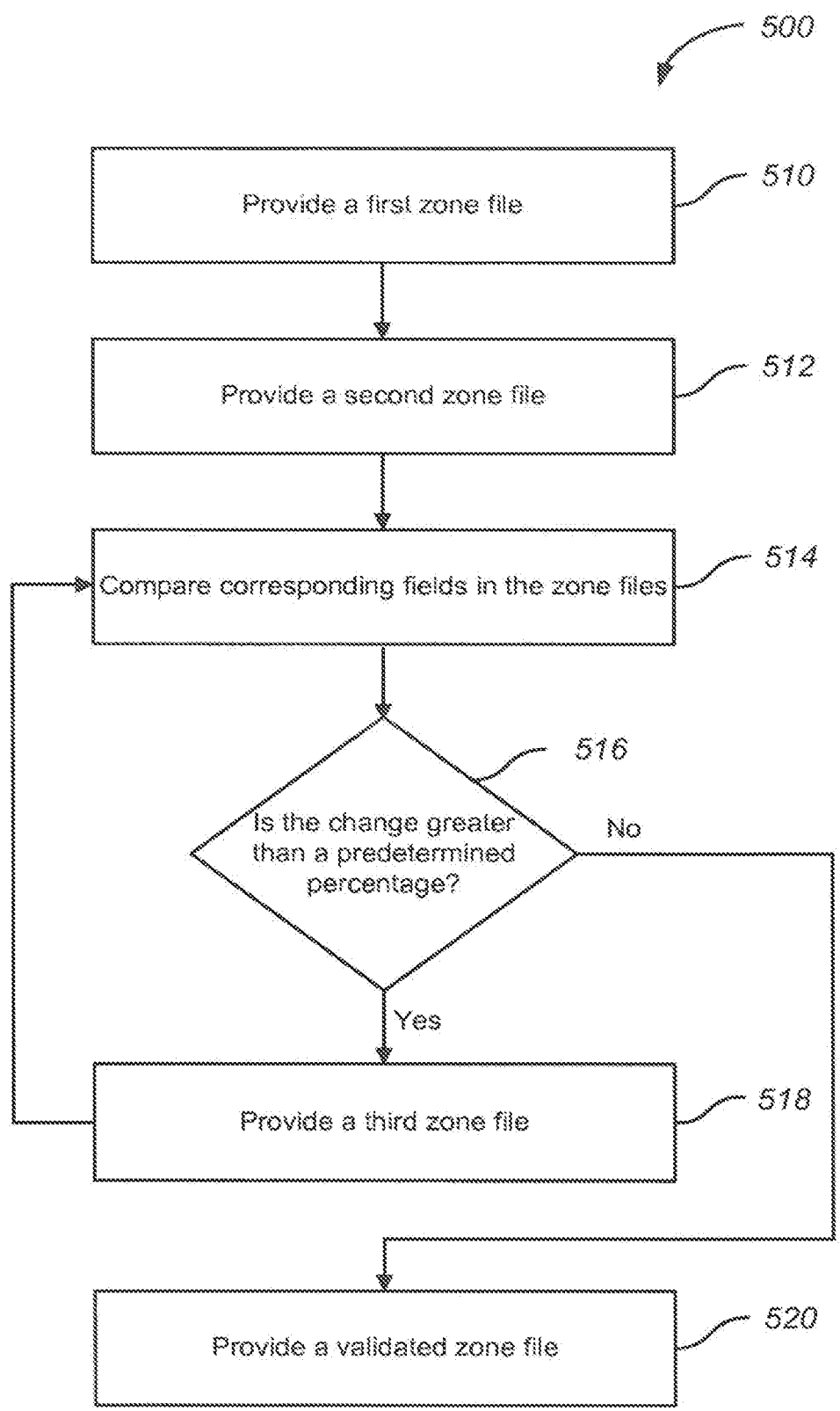
FIG. 5 is a simplified flowchart illustrating a method of validating registry zone files according to an embodiment of the present invention.

FIG. 5 is a simplified flowchart illustrating a method of validating registry zone files according to an embodiment of the present invention. The method 500 includes providing a first zone file (510) and providing a second zone file (512).

In an embodiment, the first zone file is a most recently archived zone file and the second zone file is a next most recently archived zone file. The first zone file does not have to be archived, but could be recently downloaded if validation is done on a near real-time basis. A comparison is made between fields of the first zone file and corresponding fields of the second zone file (514). The fields of the zone files, which are in a predetermined format, can be compared to determine if there are differences between the fields. As an example, the fields include domain names with associated resource records including: NS Records (nameservers), A records (IPv4 addresses for the nameservers), AAAA records (IPv6 addresses for the nameservers). These are the most common data for TLD registries, but the data could also include other resource record types such as NSEC and RRSIG (used for registries that have implemented DNS-SEC), PTR (reverse mapping of IP numbers to hostnames), MX (mail exchange records), and the like. One of ordinary skill in the art would recognize many variations, modifications, and alternatives.

A determination can be made if the change between the first zone file and the second zone file is greater than a predetermined percentage. The changes can be measured on a field-by-field basis. Typically, the zone files will have a number of incremental changes that occur from one day to the next day. As domain names are added, registrant information is changed, or the like, the zone file information will be updated, resulting in a certain number of changes on a daily basis. During the validation process, if the percentage change is greater than a predetermined threshold, for example, 5%, then an indication is provided that something other than normal operation is occurring. The frequency with which a zone file is archived can be adjusted based upon the rate at which entries are typically changed. For example, a zone file that historically experiences fewer changes per unit time than another, more rapidly changing zone file may be archived less frequently than the more dynamic zone file. The rate at which a zone file is archived can be adjusted to increase the likelihood that the difference between first and second zone file versions is below a given percentage, or any other suitable metrics. This can help ensure a smoother validation process and recovery operation in case the primary registry operator fails.

If the changes between the zone files are less than a predetermined percentage (516), then the most recent zone file is provided as a validated zone file (520) that is then used in recovering the failed registry.

If the changes between the zone files are greater than a predetermined percentage, then the next older zone file (a third zone file) is provided (518). A comparison is made between the second zone file and the third zone file (514) to determine if the changes between the third zone file (e.g., from two days ago) and the second zone file (e.g., from one day ago) are greater than a predetermined percentage. As with the comparison between the first and second zone files, if the differences between the files are less than a predetermined threshold, then the second zone file is provided as the validated zone file (520). This process of using progressively older zone files continues until two consecutive zone files are characterized by a change less than the predetermined percentage.

Utilizing embodiments of the present invention, the most recent, most accurate zone file is validated and then used in the recovery process. Using the validation process described herein will prevent a disgruntled system operator from publishing a highly corrupted or blank zone file in an attempt to sabotage the registry prior to failure. By comparing zone files, for example, in a near real-time manner, such actions can be discovered and accurate zone files can be retained. Thus, the method 500 enables the recovery registry to revert to the last known good zone file, which may be the most recent zone file or previously archived zone files. By performing zone file validation in near real-time, problems with the zone files are identified and can be resolved in advance of registry failure. As an example, data can be validated each day in implementations in which the zone files are collected and archived on a daily basis.

Another method of validating the zone file data, in addition to comparisons with previous zone files, is comparison between the zone file data and WHOIS data. Although there are differences to be expected between these two different data sources, these data sources are also highly correlated. For example, discrepancies between a zone file and a WHOIS file from the same day will typically exist because of the different times during the day that the files are captured. Effectively capturing two snapshots of the data sources, there will typically be domain names that are present in the DNS zone files, but missing from the WHOIS data. In normal operation, the domain names missing from the WHOIS data on a first day will appear on the following day as the database is updated. However, in comparing archived zone file and WHOIS data, differences in the data will typically be present and be taken into account during the validation process.

According to an embodiment of the present invention, differences between the zone file and the WHOIS data found during validation will be addressed as follows: WHOIS contains additional data that is not available in zone files, including registrar, creation date, expiration date, registrar contact information, and registrant contact information. The registrar of record for each domain name and the nameserver listed in WHOIS are an important tool to validate data inconsistencies or to respond to the appropriate registrar for emergency change requests. Domain name registrations that are on a "Hold" status will not appear in the zone file. Additionally, WHOIS data and data in the zone files may vary due to timing differences for the generation of the WHOIS data file and the zone file. These differences lead to several categories of discrepancies that are addressed by embodiments of the present invention. These categories are discussed below.

Domain Names that are in the zone file, but do not have WHOIS data—In this situation, the registrar of record cannot be determined. Therefore, pending availability of escrow data or documentation provided by a registrar, the status quo should be maintained for these domain names.

Domain Names that are not in the zone file, but do have WHOIS data—This situation can occur with domain names that are on a "Hold" status or have no authoritative nameservers. This situation may also occur due to differences in data file generation times. The registry would request clarification from the registrar of record for domain names missing from the zone file without explanation under one of these situations. This could result in a update to the zone file to include domain names that were incorrectly omitted.

Domain Names that have differences in authoritative nameservers and/or IP addresses—The zone file data should be assumed to be correct, but would generate a request to the domain name's registrar to confirm the correct data.

Pending resolution of the policy and business issues related to the registry operations of the TLD, the expiration date information should generally be ignored, that is, a domain name that passes its expiration date will continue to remain in the zone file and will not be deleted. The intent is to maintain status quo until registrars and registrants have the opportunity to renew expired registrations.

Although the phases described herein can be performed independently, some embodiments perform them in order to effect a staged or prioritized roll back of the failed registry database. As an example, recovery of DNS resolution services, recovery of WHOIS services, restoration of the complete registry database using escrow data, and the like.

Embodiments of the present invention perform Phase 3 in which all registry data is validated using escrow data. In these embodiments, data from the TLD zone files, the bulk WHOIS data, escrow data, and combinations thereof can be utilized during the registry recovery process. Data consistency rules are utilized to combine information from these various sources and to identify and resolve data inconsistencies.

Access to the escrow data, pursuant to the generic TLD registry agreements, is a component of a system by which the recovery registry accepts both a full deposit and periodic (e.g., daily) incremental zone files, validates the data and then populates a new registry database. As a general purpose system, the embodiments described herein utilize registries that adhere to a standard data escrow format. In addition, the system has the flexibility to accommodate processes for unique registry requirements, such as reserved name lists, IDN tables, and the like. It should be noted that in some implementations, the registry database will be reconstituted, but historical data will not be available.

The escrow data files from the failed registry are made available by the failed registry's escrow provider. Typically, these escrow files are provided to ICANN, which then makes them available to the recovery registry. The escrow data includes: Domain Names, Nameserver, Authinfo, IP addresses, Status, Contact data (including Registrar and Registrant (for thick registries)), Creation, Modification, and Expiration Dates, and the like. The escrow data is stored in a standardized format specified in registry agreements. As an example of escrow data for a TLD, ICANN, ".COM Agreement Appendix 1 Data Escrow Specification," dated Mar. 1, 2006 (available at the ICANN website) (hereby incorporated by reference) includes escrow data that is stored as part of the registry agreement for the .COM TLD.

The Registrar Weekly Reports include the Registrar Domain Report, which is a report that contains data for domains sponsored by all registrars. Each domain is listed once with the current status and associated nameserver. The fields of this report are:
  Domain Name (domainname)
  Server name for each nameserver (servername)
  Registrar ID (GURID)
  Updated Date (updatedate)
  Creation Date (createdate)
  Expiration Date (expirationdate)
  Status Information (statusname)
  DNSSEC-Related Key Material (dnssec) [as applicable]

The Registrar Weekly Reports also include the Registrar Nameserver Report, which is a report that contains data for all nameservers sponsored by all registrars. The nameserver is listed once with all associated information. The fields of this report are:
  Server Name (servername)
  IP Address (ipaddress)
  Registrar ID (gurid)
  Updated Date (updatedate)
  Creation Date (createdate)
  Expiration Date (expirationdate)
  Status Information (statusname)

The Registrar Weekly Reports additionally includes the Registrar WHOIS Report, which is a report that contains data for registrars sponsoring registered domains and nameservers and consists of one record for each registrar. The fields of this report are:
  Registrar ID (REGISTRARID)
  Registrar Name (REGISTRARNAME)
  Address 1 (ADDRESSLINE1)
  Address 2 (ADDRESSLINE2)
  Address 3 (ADDRESSLINE3)
  City (CITY)
  State/Province (STATEPROVINCE)
  Postal Code (POSTALCODE)
  Country (COUNTRYCODE)
  Telephone Number (PHONENUMBER)
  Fax Number (FAXNUMBER)
  E-Mail Address (EMAIL)
  Whois Server (WHOISSERVER)
  Web URL (URL)
  Updated Date (UPDATEDATE)
  Administrative Contact First Name (ADMINFNAME)
  Administrative Contact Last Name (ADMINLNAME)
  Administrative Contact Telephone Number (ADMINPHONE)
  Administrative Contact E-Mail (ADMINEMAIL)
  Billing Contact First Name (BILLINGFNAME)
  Billing Contact Last Name (BILLINGLNAME)
  Billing Contact Telephone Number (BILLINGPHONE)
  Billing Contact E-Mail (BILLINGEMAIL)
  Technical Contact First Name (TECHFNAME)
  Technical Contact Last Name (TECHLNAME)
  Technical Contact Telephone Number (TECHPHONE)
  Technical Contact E-Mail (TECHEMAIL)

The escrow data includes incremental daily changes as well as full weekly data that is deposited with a third party escrow agent by the failed registry. ICANN has the right to extract this data under terms of the escrow agreement. As an example of escrow data for another TLD, ICANN, ".NAME Agreement Appendix 1 Data Escrow Specification," dated May 2009 (available at the ICANN website) (hereby incorporated by reference) includes escrow data that is stored as part of the registry agreement for the .NAME TLD.

According to embodiments of the present invention, reconstitution of the authoritative registry database is provided by using escrowed data. The escrow process is based on a three party agreement between the registry operators, ICANN, and an escrow agent. The escrow agent receives periodic (e.g., daily, weekly, or the like) updates on information from the registry. The escrowed data is provided in a standard escrow data format. For a smaller, lower volume registry, updates are typically provided on a weekly basis. For the largest registries, such as .com, updates are provided to the escrow agent on a daily basis. In a particular implementation, an incremental file of all the daily changes that have occurred to the registry during the day are transmitted to the escrow agent. On a less frequent periodic basis, for example, weekly, a full deposit of the data for the registry is deposited with the escrow agent. According to the TLD registry agreement, ICANN has rights to access the escrow data under certain conditions defined in the agreement. To access the data, ICANN is required to meet the conditions of the agreement with the registry operator and the contractual terms included therein.

After failure of the failed registry, the escrow files will be delivered from the escrow agent to ICANN and then to the recovery registry operator. In some implementations, the escrowed data could be delivered directly to the recovery registry operator based on coordination with ICANN, through a fourth party, or the like. Comparing the WHOIS data and the escrow data, the escrow data will include additional information that may not be available from either the zone file or the WHOIS file. As examples, specific information on registrars, account information, additional information on domain names, contact information pass phrases, and the like can be included in the escrow data as supplementary to the zone file and the WHOIS data. Using this information from the escrow data, full reconstructions of the registry can potentially be performed by utilizing the daily updates and the full data sets stored in escrow. After the registry data is recreated in a database (i.e., a recreated registry database is populated), the registry data is validated.

When the recovery registry operator receives the escrow files from ICANN or the third party escrow agent, the recovery registry operator can recreate the registry database by starting with the last full deposit file and applying each incremental daily update file. The operator will then complete the validation of complete registry data using the registrar data. According to one implementation, the priority of authoritative data is 1) Escrow Data, 2) Registrar Data, 3) DNS Data.

In order to validate the registry data, rules are applied to the various data sets in order to reconcile inconsistencies and discrepancies between, for example, the zone file, the bulk WHOIS data, and the escrowed data. This validation process, which can be performed prior to registry failure, can potentially prevent intentional or malicious damage to the escrow files, in a manner similar to the validation of the zone files. Additionally, the validation process can indicate the presence of data corruption in the escrow data. Thus, embodiments of the present invention utilize predetermined rules to reconcile discrepancies during the validation process.

The following is provided as an example of a method of reconciling the escrow data and the current zone file. The database created from the escrow data is compared to the currently active zone file as part of the validation process. It should be noted that the date of the last escrow data may be significantly different from the creation date of the current zone file. When the zone file creation date is earlier than the date of the escrow data, any updated data will be applied to the zone file. This includes adding and deleting domain names and modifying nameserver and IP address data, and adjusting for any emergency updates that were applied in Phase 2. When the date of the escrow data file is earlier than the zone file creation date, the recovery registry operator will identify:

Domain names in the zone that are missing escrow data: The registry will maintain the zone file and request registration data from the registrar as determined from the bulk WHOIS data.

Domain names in escrow data that are not in the zone: The recovery registry operator will confirm with the appropriate registrars that these names have been deleted. In the event of a discrepancy, the registry will update the zone file with the additional domain names. It should be noted that domain names that have a status of Hold in the escrow data should not be in the zone file and should not be added.

Nameserver and IP Address inconsistencies: Escrow data should be considered authoritative, although the recovery registry operator should review and confirm changes with the appropriate registrar prior to updating the current zone file.

The recovery registry operator generates a complete report of registration data, including domain name, nameserver, IP addresses, contact data, authinfo, and the like by registrar and provides each registrar with a copy of their data to review and compare against their own database. The registry data is the authoritative source. Therefore, any discrepancies identified by the registrar that are reported to the registry must include supporting documentation including complete transaction logs for the registry objects in question.

Embodiments of the present invention provide methods and systems for registrar coordination and communication. As an example, the recover registry operator may contact registrars, providing transition agreements. Additionally, the recovery registry operator can provide reports/data files to registrars with results of the recovery process for all data associated with that registrar for confirmation and resolution of discrepancies.

Additionally, embodiments of the present invention enable modifications of registration data to be made. These modifications can include activating a SRS for registrars to update data, and/or perform manual edits through customer service. This includes implementation of backend processes to update the TLD zone file, WHOIS data, and the like. In addition to other functionality, embodiments of the present invention enable recovery and restoration of full registration services with updates published to all resolution services.

It should be noted that in some recovery scenarios, the recovery process may be terminated prior to the use of escrow data. In these recovery scenarios, the validated zone data and WHOIS data are sufficient to restore the functionality of the failed registry. In other recovery scenarios, the registry is restored using only the escrow data. Of course, combinations of these data sources can be utilized as well in other implementations.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for recovering a first failed registry, the system comprising:
    one or more memory devices storing instructions; and
    one or more processors coupled to the one or more memory devices and capable of executing the instructions to perform a method comprising:
        receiving, over a communications network, a zone file with data associated with the first failed registry;
        receiving, over the communications network, archived bulk registration data for the first failed registry;
        activating a shared registry system to enable registrars to update the data in the zone file;
        reconciling discrepancies in the zone file based on the archived bulk registration data and the data that is updated by the shared registry system using one or more time-based rules;
        publishing, over the communications network, in response to an indication of a failed registry event, the data that has been reconciled to a nameserver of a recovery registry; and
        forming a registry database associated with the first failed registry based on the publishing.

2. The system of claim 1:
    wherein receiving archived bulk registration data for the first failed registry comprises receiving information to determine a registrar of record for one or more domains identified in the zone file.

3. The system of claim 2, wherein the archived bulk registration data comprises archived bulk WHOIS data.

4. The system of claim 2, wherein the zone file and the archived bulk registration data are received from a data provider.

5. The system of claim 2, the method further comprising receiving the indication of the failed registry event from a recovery registry.

6. The system of claim 2, wherein the zone file and the information to determine the registrar of record are received directly from the first failed registry.

7. The system of claim 2, wherein the zone file and the information to determine the registrar of record are received from a third party.

8. The system of claim 7, wherein the third party is a data escrow agent.

9. The system of claim 7, wherein the third party is another existing registry operator.

10. The system of claim 2, the method further comprising:
    initiating a root zone change request for a zone associated with the first failed registry; and
    updating authoritative nameservers.

11. The system of claim 2, wherein the zone file comprises at least domain names, nameserver information, and Internet Protocol (IP) addresses.

12. The system of claim 11, wherein the zone file further comprises NSEC and RRSIG data.

13. The system of claim 12, wherein the archived bulk registration data comprises at least one of domain names, nameserver information, IP addresses, registrant information, status, or contact data.

14. The system of claim 2, the method further comprising enabling a registrar to update ownership information using the shared registry system.

15. A system for recovering a first registry, the system comprising:
    one or more memory devices storing instructions; and
    one or more processors coupled to the one or more memory devices and capable of executing the instructions to perform a method comprising:
      receiving a first zone file with data associated with the first registry, wherein the first zone file is a zone file that is archived during a first time period;
      receiving a second zone file with data associated with the first registry, wherein the second zone file is a zone file that is archived during a second time period, wherein the second time period is more recent than the first time period;
      creating reconciled data by reconciling the data in the first zone file with the data in the second zone file, wherein reconciling the data further comprises choosing the most recent data from the data in the first zone file and the data in the second zone file to be included in the reconciled data;
      publishing, in response to an indication of a failed registry event, the reconciled data to a nameserver of a recovery registry; and
      forming a registry database associated with the first registry based on the publishing.

* * * * *